(12) United States Patent
Watanabe

(10) Patent No.: US 11,540,442 B2
(45) Date of Patent: Jan. 3, 2023

(54) WORKING MACHINE

(71) Applicant: MAKITA CORPORATION, Anjo (JP)

(72) Inventor: Koji Watanabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 142 days.

(21) Appl. No.: 17/098,691

(22) Filed: Nov. 16, 2020

(65) Prior Publication Data

US 2021/0153433 A1    May 27, 2021

(30) Foreign Application Priority Data

Nov. 27, 2019   (JP) .............................. JP2019-214473

(51) Int. Cl.
*A01D 34/90*    (2006.01)
*A01D 34/78*    (2006.01)

(52) U.S. Cl.
CPC ........... *A01D 34/902* (2013.01); *A01D 34/78* (2013.01)

(58) Field of Classification Search
CPC .... A01D 34/902; A01D 34/78; A01D 34/828; A01D 34/90; A01D 34/73; F16C 1/02; F02B 63/02; F01M 11/064
USPC ...... 30/226, 296.1, 247, 167, 287, 296, 388; 56/289, 295
See application file for complete search history.

(56) References Cited

U.S. PATENT DOCUMENTS

| | | | | |
|---|---|---|---|---|
| 3,781,991 A * | 1/1974 | Stretton | ............... | A01D 34/902 30/276 |
| 6,021,630 A * | 2/2000 | Higashi | .................. | A01D 34/90 30/276 |
| 7,646,118 B2 * | 1/2010 | Yoshida | ................. | H02K 9/227 310/60 R |
| 8,534,515 B2 * | 9/2013 | Muchin | ................ | A01D 34/902 224/264 |
| 2002/0121262 A1 * | 9/2002 | Kawamoto | ............. | F02B 63/02 123/196 W |
| 2013/0247386 A1 * | 9/2013 | Ishikawa | ............... | A01D 34/828 30/296.1 |

FOREIGN PATENT DOCUMENTS

| | | | | |
|---|---|---|---|---|
| DE | 20201313750 U1 * | 2/2014 | ........... | H01M 50/20 |
| JP | 2000-316349 A | 11/2000 | | |
| JP | 2021070111 A * | 5/2021 | .......... | A01D 34/902 |
| KR | 2009003838 A * | 4/2009 | .......... | A01D 34/902 |

* cited by examiner

*Primary Examiner* — Ghassem Alie
(74) *Attorney, Agent, or Firm* — Sughrue Mion, PLLC

(57) ABSTRACT

A working machine may include an operation rod; a tool disposed on a front portion of the operation rod; a prime mover configured to drive the tool; a first harness connector disposed frontward of a center of gravity of the working machine and configured to be connected to a first end of the harness; and a second harness connector disposed rearward of the center of gravity of the working machine and configured to be connected to a second end of the harness opposite to the first end. In a side view of the working machine, the center of gravity of the working machine may be positioned on a first harness connector side with respect to a plane that passes through a midpoint of a line connecting the first harness connector with the second harness connector and is perpendicular to the line.

3 Claims, 6 Drawing Sheets

(Comparative Example)

WORKING MACHINE

CROSS-REFERENCE TO RELATED APPLICATION

This application claims priority to Japanese Patent Application No. 2019-214473 filed on Nov. 27, 2019, the contents of which are hereby incorporated by reference into the present application.

TECHNICAL FIELD

The art disclosed herein relates to a working machine.

BACKGROUND ART

Japanese Patent Application Publication No. 2000-316349 describes a working machine to which a harness that is wearable over a shoulder of a user is attachable. The working machine of Japanese Patent Application Publication No. 2000-316349 includes an operation rod, a tool disposed on a front portion of the operation rod, a prime mover configured to drive the tool, and a harness connector configured to be connected to the harness.

SUMMARY

A working machine is known with which work is performed by pressing a tool disposed on a front portion of an operation rod against ground. With such a working machine, the work is performed with the operation rod tilted such that the front portion thereof is located lower than a rear portion of the operation rod. If the operation rod is tilted such that the front portion is located higher than the rear portion while the user is holding the working machine with a harness, workability for the user to work using the working machine is degraded as compared to when the operation rod is tilted such that the front portion is located lower than the rear portion.

The disclosure herein provides a working machine that enables an operation rod to tilt such that a front portion of the operation rod is located lower than a rear portion of the operation rod when a harness is worn over a shoulder of a user.

The disclosure herein discloses a working machine to which a harness that is wearable over a shoulder of a user is attachable. The working machine may comprise: an operation rod; a tool disposed on a front portion of the operation rod; a prime mover configured to drive the tool; a first harness connector disposed frontward of a center of gravity of the working machine and configured to be connected to a first end of the harness; and a second harness connector disposed rearward of the center of gravity of the working machine and configured to be connected to a second end of the harness opposite to the first end. In a side view of the working machine, the center of gravity of the working machine is positioned on a first harness connector side with respect to a plane that passes through a midpoint of a line connecting the first harness connector with the second harness connector and is perpendicular to the line connecting the first harness connector with the second harness connector.

When the harness is worn over the shoulder of the user, the shoulder of the user serves as a fulcrum. Further, since a downward force (that is, gravitational force) acts on the center of gravity of the working machine, the center of gravity serves as a point of effort. With the above configuration, the center of gravity of the working machine is positioned on the first harness connector side with respect to the plane perpendicular to the line connecting the first harness connector with the second harness connector when the harness is worn over the shoulder of the user, thus the gravitational force acts in a direction that brings the front portion of the operation rod lower than the rear portion thereof. As such, when the harness is worn over the shoulder of the user, the front portion of the operation rod can be located lower than the rear portion thereof. As a result, workability for the user can be improved.

DETAILED DESCRIPTION

Figure 1:
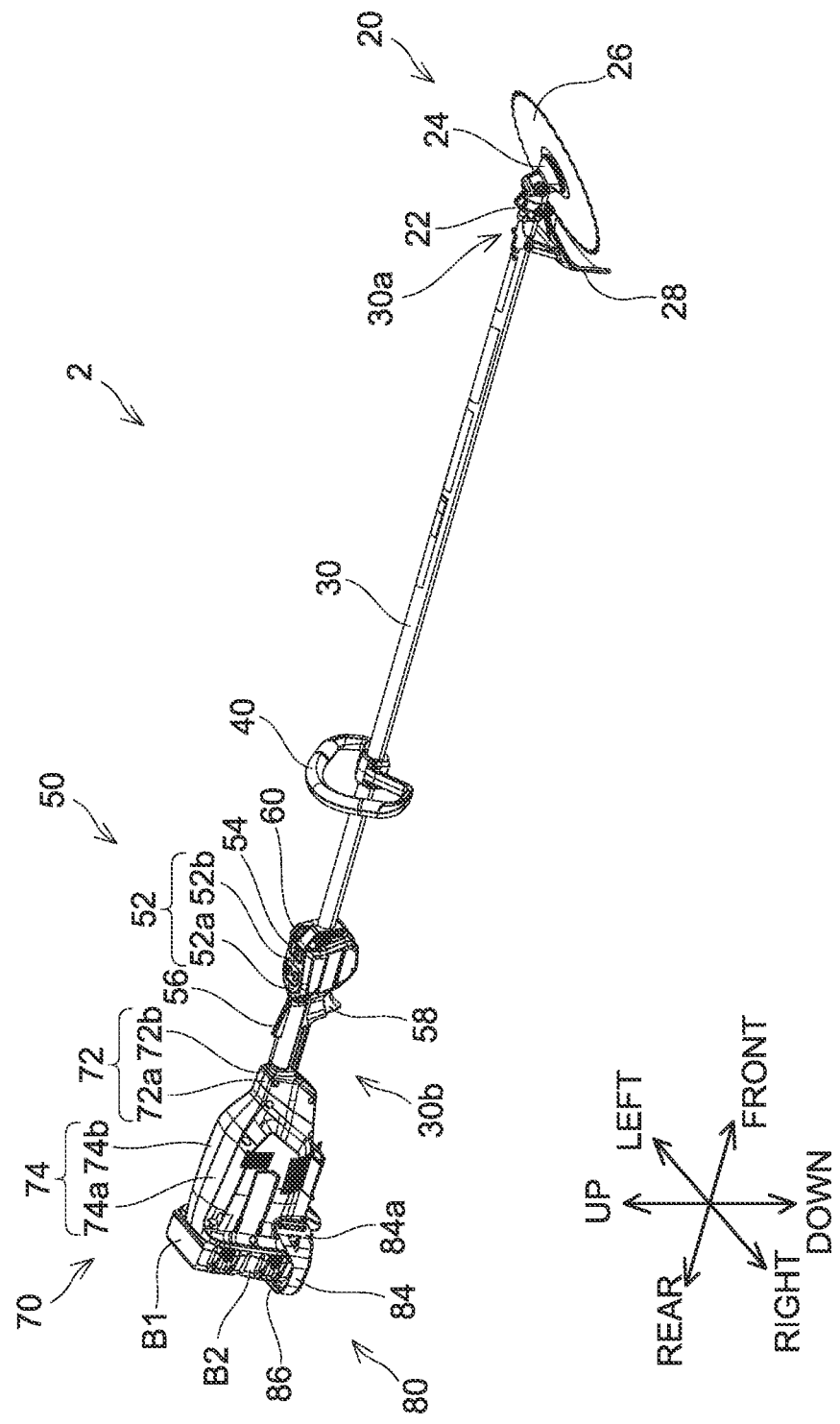
FIG. 1 is a perspective view of a trimmer 2 of an embodiment.

The disclosure herein discloses a working machine to which a harness that is wearable over a shoulder of a user is attachable. The working machine may comprise: an operation rod; a tool disposed on a front portion of the operation rod; a prime mover configured to drive the tool; a first harness connector disposed frontward of a center of gravity of the working machine and configured to be connected to a first end of the harness; and a second harness connector disposed rearward of the center of gravity of the working machine and configured to be connected to a second end of the harness opposite to the first end. In a side view of the working machine, the center of gravity of the working machine is positioned on a first harness connector side with respect to a plane that passes through a midpoint of a line connecting the first harness connector with the second harness connector and is perpendicular to the line connecting the first harness connector with the second harness connector.

In one or more embodiments, the second harness connector may be disposed in a vicinity of a rear end of the working machine.

The above configuration allows the center of gravity of the working machine to be easily positioned on the first harness connector side with respect to the plane perpendicular to the line connecting the first harness connector with the second harness connector, as compared to a configuration in which the second harness connector is disposed frontward of the vicinity of the rear end of the working machine. As such, a degree of freedom for a position of the first harness connector can be increased.

In one or more embodiments, the prime mover may be a motor. The working machine may further comprise: a housing disposed on a rear portion of the operation rod; a battery pack configured to be detachably attached to a rear portion of the housing and supply electric power to the motor; and a battery guard configured to guard the battery pack from impact. The battery guard may comprise the second harness connector.

A large load acts on the first harness connector and the second harness connector to which the harness is connected. Due to this, a material with high strength (such as metal) needs to be used for the first harness connector and the second harness connector. Further, a material with high strength (such as metal) needs to be used for the battery guard to guard the battery pack from impact. Such materials with high strength are heavy, and use of such materials in large quantities results in a weight increase in the working machine. In the above configuration, the battery guard can be used also as the second harness connector. Thus, the weight increase in the working machine can be suppressed.

In one or more embodiments, a loop handle may be disposed on the operation rod. The loop handle may be configured to be gripped by a user. The first harness connector may be disposed rearward of the loop handle.

For example, when the user grips the loop handle with his/her left hand and the rear portion of the operation rod with his/her right hand, the harness is worn over the left shoulder of the user. In such a state, if the first harness connector is disposed frontward of the loop handle, the left hand, which is gripping the loop handle, is likely to hit the harness. In the above configuration, the first harness connector is disposed rearward of the loop handle, thus hit of the left hand which is gripping the loop handle with the harness can be suppressed. Thus, the workability for the user can be improved.

In one or more embodiments, a grip may be disposed rearward of the loop handle on the operation rod. The grip may be configured to be gripped by the user. The grip may comprise the first harness connector.

In the above configuration, a member that serves as the first harness connector does not need to be disposed separately on the operation rod. As such, the number of components of the working machine can be reduced.

EMBODIMENT (Embodiment)

Figure 2:
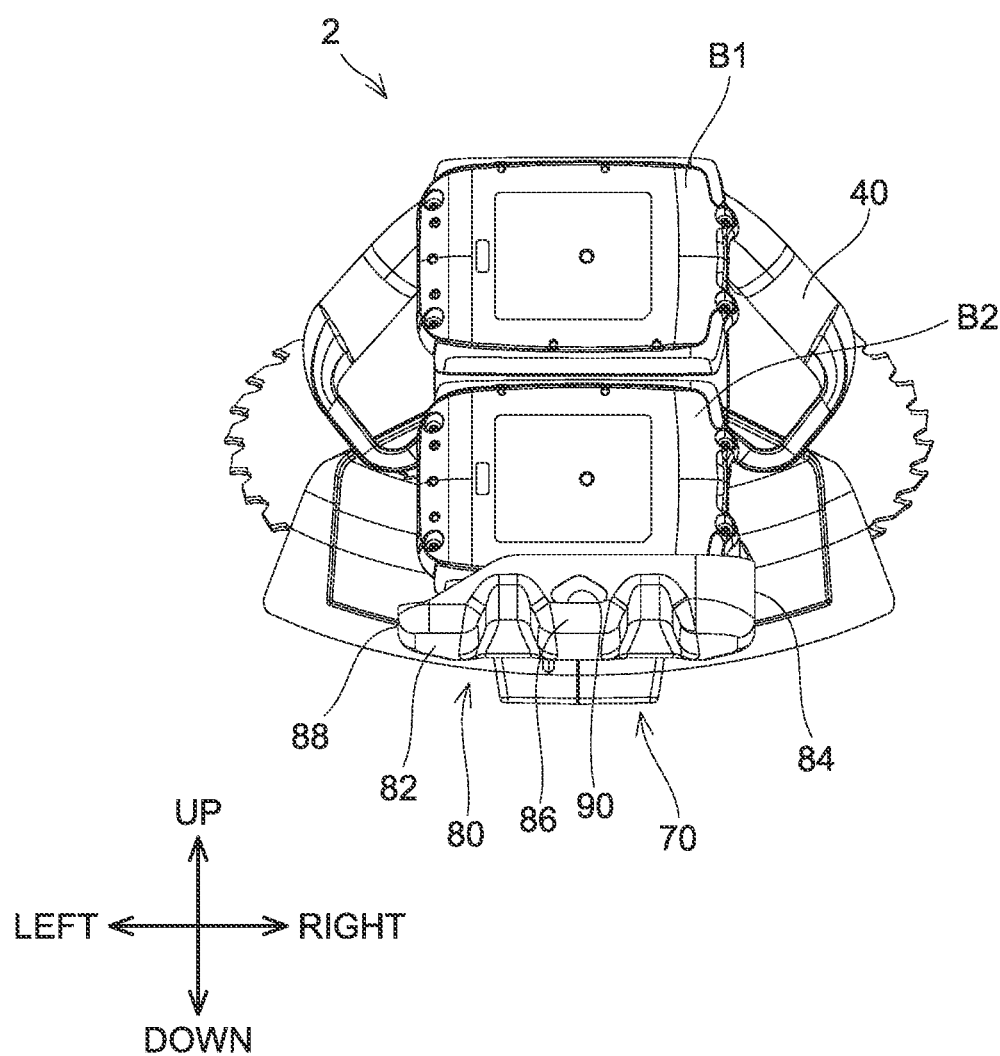
FIG. 2 is a rear view of the trimmer 2 of the embodiment.

A trimmer 2 will be described with reference to FIGS. 1 to 3. As shown in FIG. 1, the trimmer 2 is provided with a cutting blade unit 20, an operation rod 30, a loop handle 40, a grip unit 50, and a rear housing 70. In the description below, a longitudinal direction of the operation rod 30 will be termed a front-rear direction, an up-down direction in FIG. 3 will be termed an up-down direction, and a direction perpendicular to the front-rear direction and the up-down direction will be termed a right-left direction.

The operation rod 30 in FIG. 1 has a hollow pipe shape and extends linearly. The cutting blade unit 20 is disposed on a front portion 30a of the operation rod 30, and the grip unit 50 and the rear housing 70 are disposed on a rear portion 30b of the operation rod 30. A transmission shaft (not shown) is rotatably housed inside the operation rod 30. The loop handle 40 configured to be gripped by a user is disposed on the operation rod 30 between the cutting blade unit 20 and the grip unit 50. The loop handle 40 has a looped hollow pipe shape that curves out from the operation rod 30 upward and sideways.

The cutting blade unit 20 includes a rod fixing portion 22, a cutting blade attaching portion 24, and a safety cover 28. A front end of the operation rod 30 is inserted in the rod fixing portion 22. A disk-shaped cutting blade 26 is attached to the cutting blade attaching portion 24. Specifically, the cutting blade 26 is fixed to a cutting blade shaft (not shown) of the cutting blade attaching portion 24. The cutting blade shaft is connected to the transmission shaft in the operation rod 30 via a gear (not shown) inside the rod fixing portion 22. The safety cover 28 is disposed rearward of the rod fixing portion 22.

The grip unit 50 includes a grip housing 52, a power switch 54, a lever 56, a trigger 58, and a first harness connector 60. The grip housing 52 is a member configured to be gripped with a user's hand that is different from the hand gripping the loop handle 40 when the user uses the trimmer 2. The grip housing 52 is constituted of a resin material shaped to cover an outer surface of the operation rod 30. The grip housing 52 includes a right grip housing 52a and a left grip housing 52b. The right grip housing 52a and the left grip housing 52b interpose the operation rod 30 therebetween.

Figure 5:
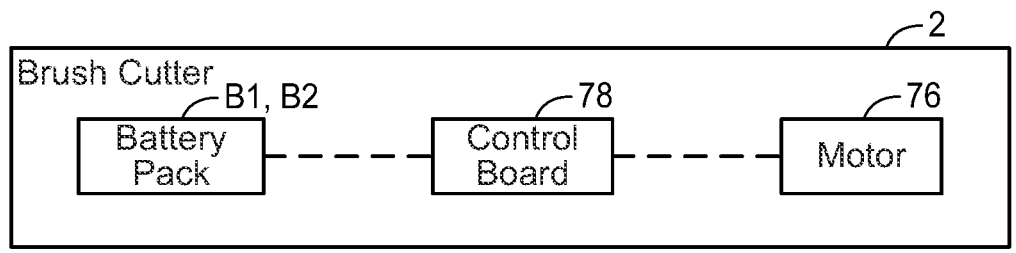
FIG. 5 shows an electrical configuration of the trimmer 2 of the embodiment.

The first harness connector 60, the power switch 54, and the lever 56 are disposed on an upper surface of the grip housing 52 in this order from a front side toward a rear side of the trimmer 2. The first harness connector 60 is configured integrally with the grip housing 52. The trigger 58 is disposed on a lower surface of the grip housing 52. The power switch 54 is a switch for switching the trimmer 2 between an on state and an off state. The trigger 58 is a member with which the user controls on and off operations of a motor 76 (see FIG. 5). When the lever 56 is not pressed in by the user, a press-in operation on the trigger 58 by the user is prohibited. On the other hand, when the lever 56 is pressed in by the user, the press-in operation on the trigger 58 by the user is allowed. The user can perform an operation to drive the motor 76 by pressing in the lever 56 with the palm of one hand and pressing in the trigger 58 with finger(s) of the same hand.

The rear housing 70 includes a first housing 72 and a second housing 74. The first housing 72 is disposed frontward of the second housing 74. The first housing 72 includes a first right housing 72a and a first left housing 72b. The first right housing 72a is configured integrally with the right grip housing 52a. The first left housing 72b is configured integrally with the left grip housing 52b.

The second housing 74 includes a second right housing 74a and a second left housing 74b. The second housing 74 houses the motor 76 (see FIG. 5) and a control board 78 (see FIG. 5) configured to control operations of the motor 76. The control board 78 is configured to control operations of the motor 76 by controlling electric power supplied from batteries B1, B2 to the motor 76. When the motor 76 is driven, the cutting blade 26 is rotated via an output shaft (not shown) in the second housing 74, the transmission shaft (not shown) in the operation rod 30, the gear (not shown) in the rod fixing portion 22, and the cutting blade shaft (not shown) in the cutting blade attaching portion 24. A battery interface (not shown) to which the batteries B1, B2 can be detachably attached is disposed at a rear portion of the second housing 74. The batteries B1 and B2 are slidable with respect to the battery interface and can be attached thereto by being slid with respect to the battery interface. A sliding direction of the batteries B1, B2 with respect to the battery interface is the right-left direction. In a variant, a single battery may be attached to the rear housing 70, or three or more batteries may be attached to the rear housing 70. Further, the sliding direction of the batteries with respect to the battery interface may be the up-down direction or the front-rear direction.

A battery guard 80 constituted of metal is connected to the rear portion of the second housing 74. The battery guard 80 is configured separately from the second housing 74. The battery guard 80 is configured to guard batteries B1, B2 from impact. The battery guard 80 includes a bottom wall 82 (see FIG. 2), a right wall 84, a rear wall 86, and a left wall 88 (see FIG. 2). A front portion 84a of the right wall 84 is coupled to the second right housing 74a. Further, although not shown, a front portion of the left wall 88 is coupled to the second left housing 74b. As shown in FIG. 2, a second harness connector 90 is disposed on the rear wall 86. That is, the second harness connector 90 is configured integrally with the battery guard 80 and is disposed in a vicinity of a rear end of the trimmer 2.

A harness 100 attachable to the trimmer 2 will be described with reference to FIG. 3. The harness 100 is worn over a shoulder of the user to support the trimmer 2.

The harness 100 includes a belt 102, a shoulder pad 104, a first attaching portion 106, and a second attaching portion 108. The shoulder pad 104 is constituted of a soft material. The shoulder pad 104 is disposed at a center 102c of the belt 102. The belt 102 includes a first end 102a and a second end 102b opposite to the first end 102a. The first attaching portion 106 is disposed at the first end 102a, and the second attaching portion 108 is disposed at the second end 102b. The first attaching portion 106 and the second attaching portion 108 are metal members configured to be attached to the first harness connector 60 and the second harness connector 90, respectively.

Figure 3:
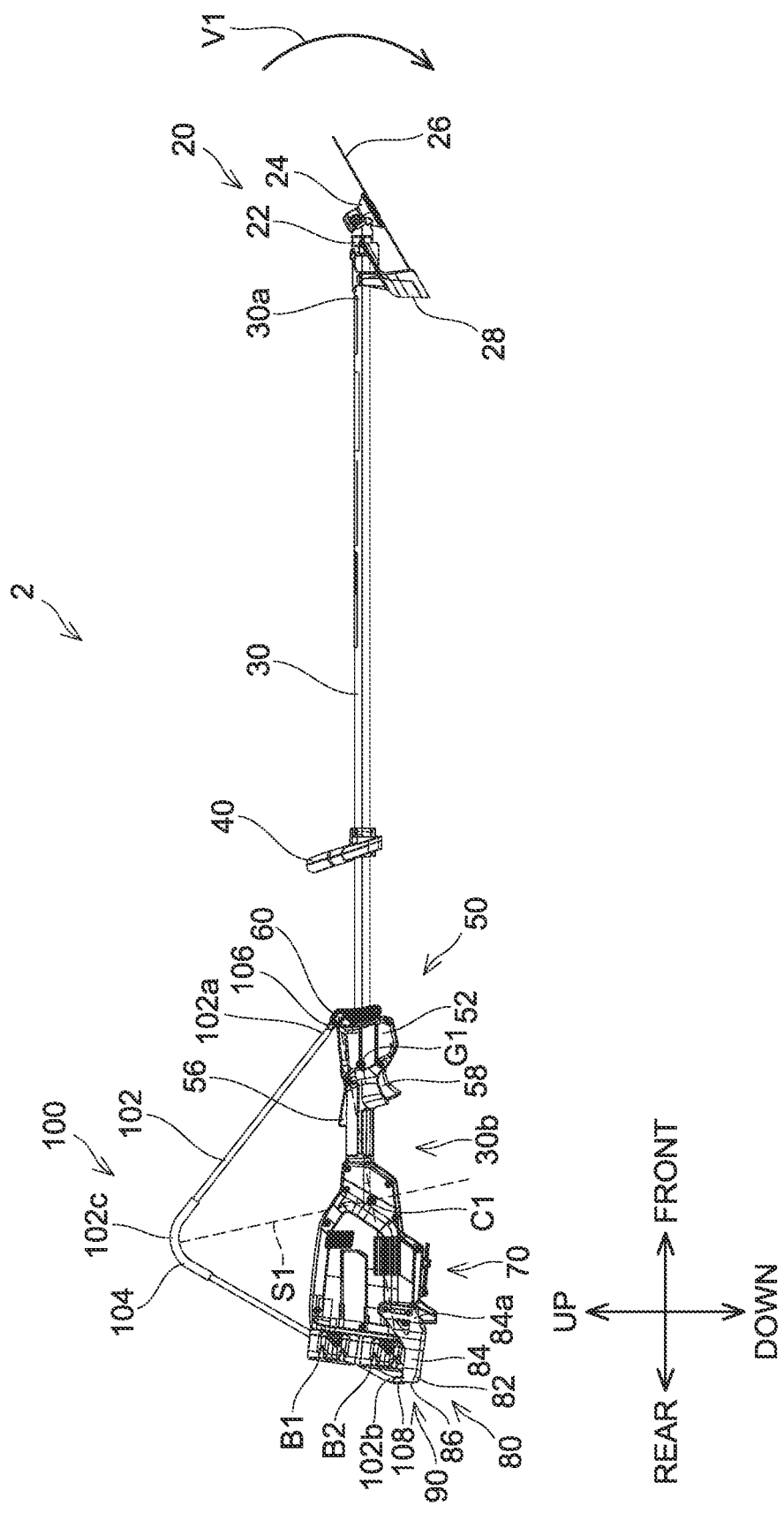
FIG. 3 is a right-side view of the trimmer 2 of the embodiment.
Figure 4:
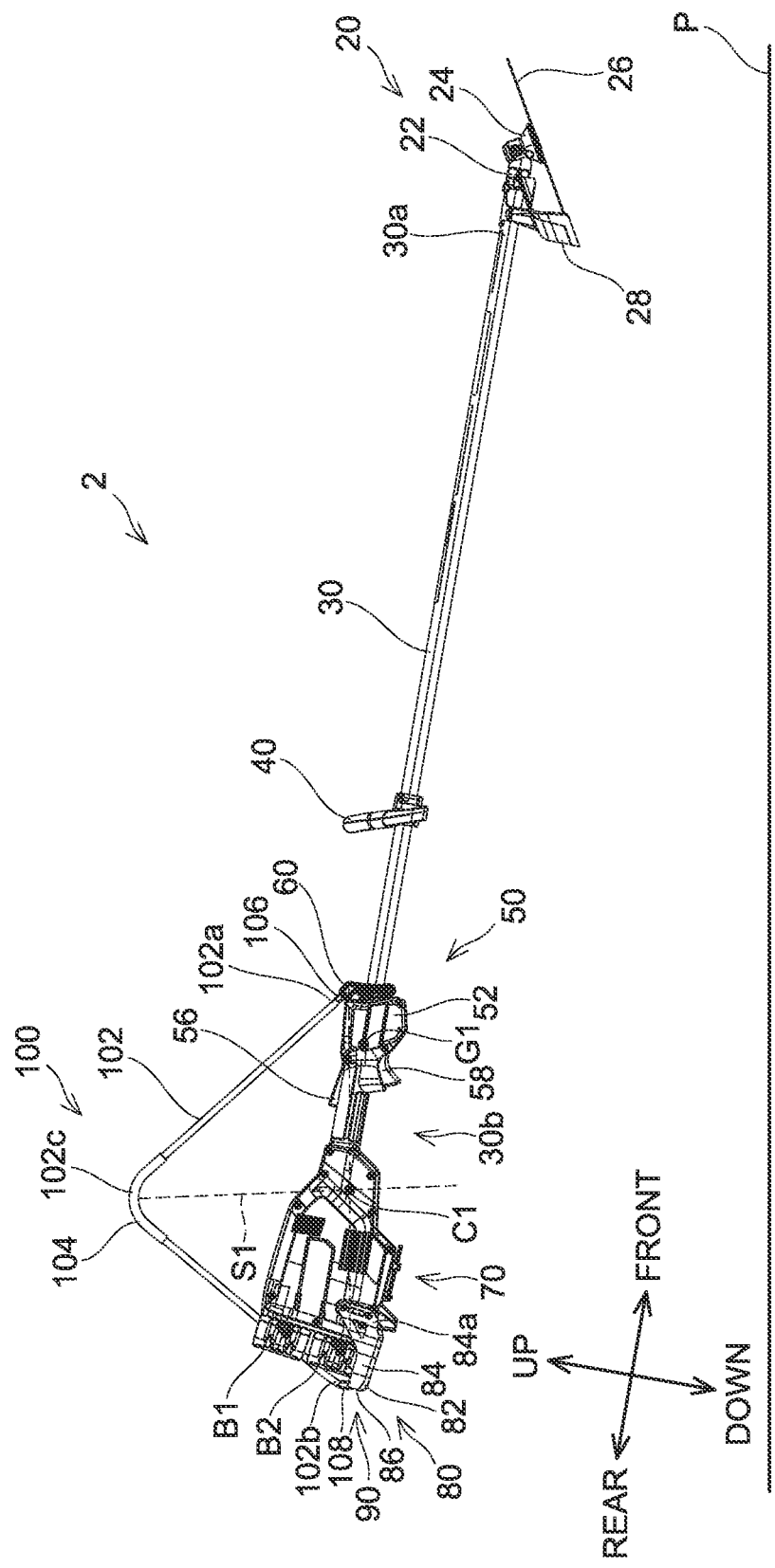
FIG. 4 shows the trimmer 2 of the embodiment while a user is holding the trimmer 2.

When the user wears the harness 100 over his/her shoulder with the trimmer 2 of FIG. 3 attached thereto, the center 102c of the belt 102 supported by the user serves as a fulcrum. Further, since a downward force (that is, gravitational force) acts on a center of gravity G1 of the trimmer 2, the center of gravity G1 serves as a point of effort. Here, the "center of gravity G1 of the trimmer 2" refers to a center of gravity of the trimmer 2 including the cutting blade unit 20, the operation rod 30, the loop handle 40, the grip unit 50, the rear housing 70, the batteries B1, B2, and the battery guard 80. A relationship of the fulcrum and the point of effort determines a direction of moment that acts on the trimmer 2 when the trimmer 2 is seen from the right, and tilt of the trimmer 2 in the front-rear direction is thereby determined. Specifically, the tilt of the trimmer 2 in the front-rear direction is determined depending on whether the center of gravity G1 of the trimmer 2 is positioned on a first harness connector 60 side with respect to a plane S1 that passes through a midpoint C1 of a line connecting the first harness connector 60 with the second harness connector 90 and is perpendicular to the line connecting the first harness connector 60 with the second harness connector 90 or the center of gravity G1 of the trimmer 2 is positioned on a second harness connector 90 side with respect to the plane S1. In this embodiment, the center of gravity G1 is positioned on the first harness connector 60 side with respect to the plane S1. In this case, the moment acts on the trimmer 2 in a direction V1 that brings the front portion 30a of the operation rod 30 lower than the rear portion 30b. As a result, as shown in FIG. 4, the trimmer 2 is tilted relative to a ground P such that the front portion 30a of the operation rod 30 is located lower than the rear portion 30b when the harness 100 is worn over the shoulder of the user.

Figure 6:
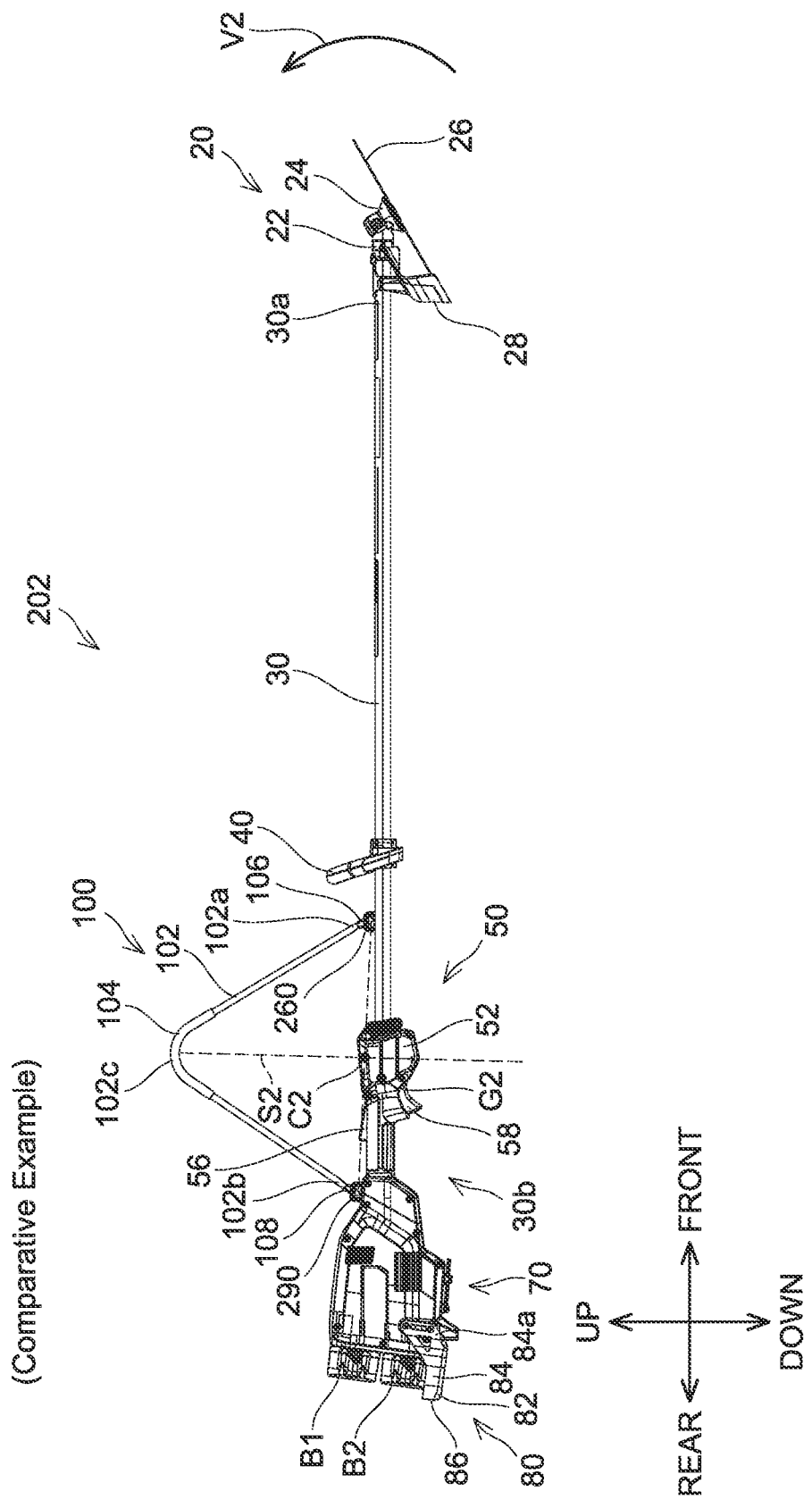
FIG. 6 is a right-side view of a trimmer 202 of a comparative example.

FIG. 6 shows a trimmer 202 of a comparative example. In the trimmer 202 of the comparative example, positions of a first harness connector 260 and a second harness connector 290 are different from the positions of the first harness connector 60 and the second harness connector 90 in the embodiment. In the trimmer 202, the first harness connector 260 is not disposed on the grip unit 50 but is disposed on a portion of the operation rod 30 that is rearward of the loop handle 40. Further, the second harness connector 290 is not disposed on a battery guard 80 but is disposed on the rear housing 70.

In the trimmer 202 of the comparative example, a center of gravity G2 of the trimmer 202 is positioned on a second harness connector 290 side with respect to a plane S2 that passes through a midpoint C2 of a line connecting the first harness connector 260 with the second harness connector 290 and is perpendicular to the line connecting the first harness connector 260 with the second harness connector 290. In this case, moment acts on the trimmer 202 in a direction V2 that brings the rear portion 30b of the operation rod 30 lower than the front portion 30a. As a result, the trimmer 202 is tilted such that the rear portion 30b of the operation rod 30 is located lower than the front portion 30a when the harness 100 is worn over the shoulder of the user.

As described above and shown in FIGS. 1 to 4, the trimmer 2 of an embodiment includes: the operation rod 30; the cutting blade unit 20 disposed on the front portion 30a of the operation rod 30; the motor 76 configured to drive the cutting blade unit 20; the first harness connector 60 disposed frontward of the center of gravity G1 of the trimmer 2 and configured to be connected to the first end 102a of the harness 100; and the second harness connector 90 disposed rearward of the center of gravity G1 of the trimmer 2 and configured to be connected to the second end 102b of the harness 100. As shown in FIGS. 3 and 4, in a side view of the trimmer 2, the center of gravity G1 of the trimmer 2 is positioned on the first harness connector 60 side with respect to the plane S1 that passes through the midpoint C1 of the line connecting the first harness connector 60 with the second harness connector 90 and is perpendicular to the line connecting the first harness connector 60 with the second harness connector 90. With this configuration, as shown in FIG. 3, the center of gravity G1 of the trimmer 2 is positioned on the first harness connector 60 side with respect to the plane S1 that is perpendicular to the line connecting the first harness connector 60 with the second harness connector 90 when the harness 100 is worn over the shoulder of the user, thus the gravitational force acts in the direction that brings the front portion 30a of the operation rod 30 lower than the rear portion 30b. As such, when the harness 100 is worn over the shoulder of the user, the front portion 30a of the operation rod 30 can be located lower than the rear portion 30b. As a result, workability for the user can be improved.

In the trimmer 2 of an embodiment, as shown in FIGS. 1 to 4, the second harness connector 90 is disposed in the vicinity of the rear end of the trimmer 2. This configuration allows the center of gravity G1 of the trimmer 2 to be easily positioned on the first harness connector 60 side with respect to the plane S1 perpendicular to the line connecting the first harness connector 60 with the second harness connector 90, as compared to a configuration in which the second harness connector 90 is disposed frontward of the vicinity of the rear end of the trimmer 2. As such, a degree of freedom for the position of the first harness connector 60 can be increased.

As shown in FIGS. 1 to 4, the trimmer 2 of an embodiment includes: the rear housing 70 disposed on the rear portion 30b of the operation rod 30; the battery B2 configured to be detachably attached to the rear portion of the rear housing 70 and supply electric power to the motor 76; and the battery guard 80 configured to guard the battery B2 from impact. The second harness connector 90 is disposed on the battery guard 80. In this configuration, the battery guard 80 can be used also as a member to which the second end 102b of the harness 100 is to be connected. Thus, weight increase in the trimmer 2 can be suppressed.

In the trimmer 2 of an embodiment, as shown in FIGS. 1, 3, and 4, the loop handle 40 configured to be gripped by the user is disposed on the operation rod 30, and the first harness connector 60 is disposed rearward of the loop handle 40. For example, when the user grips the loop handle 40 with his/her left hand and the rear portion 30b of the operation rod 30 with his/her right hand, the harness 100 is worn over the left shoulder of the user. The above configuration can suppress the left hand gripping the loop handle 40 from hitting the harness 100. Thus, the workability for the user can be improved.

In the trimmer 2 of an embodiment, as shown in FIGS. 1, 3, and 4, the grip unit 50 configured to be gripped by the user is disposed rearward of the loop handle 40 on the operation rod 30, and the first harness connector 60 is disposed on the grip unit 50. In this configuration, a member that serves as the first harness connector 60 does not need to be disposed separately on the operation rod 30. As such, the number of components of the trimmer 2 can be reduced.

(Corresponding Relationships)

The trimmer 2 is an example of "working machine". The cutting blade unit 20 is an example of "tool". The motor 76 is an example of "prime mover". The rear housing 70 is an example of "housing". The grip unit 50 is an example of "grip".

While specific examples of the present disclosure have been described above in detail, these examples are merely illustrative and place no limitation on the scope of the patent claims. The technology described in the patent claims also encompasses various changes and modifications to the specific examples described above.

(First Variant) The "working machine" is not limited to the trimmer 2, and may be a working machine with which work is performed with the front portion of its operation rod located lower than the rear portion thereof, such as a slope mower or an electric mop.

(Second Variant) The second harness connector 90 may be disposed frontward of the vicinity of the rear end of the trimmer 2 so long as the center of gravity G1 of the trimmer 2 is positioned on the first harness connector 60 side with respect to the plane S1.

(Third Variant) The first harness connector 60 may be disposed frontward of the loop handle 40 so long as the center of gravity G1 of the trimmer 2 is positioned on the first harness connector 60 side with respect to the plane S1.

(Fourth Variant) The first harness connector 60 may be disposed on the operation rod 30.

(Fifth Variant) The "prime mover" may be a brush motor or an engine.

(Sixth Variant) A housing may be disposed at the front portion 30a of the operation rod 30 and the motor 76 may be disposed in this housing.

(Seventh Variant) A U-shaped handle may be disposed on the operation rod 30 instead of the loop handle 40. In another variant, a grip unit different from the grip unit 50 may be disposed on the operation rod 30 instead of the loop handle 40.

(Eighth Variant) The trimmer 2 may not include the battery guard 80.

The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A working machine to which a harness that is wearable over a shoulder of a user is attachable, the working machine comprising:
   an operation rod;
   a tool disposed on a front portion of the operation rod;
   a prime mover configured to drive the tool;
   a first harness connector disposed frontward of a center of gravity of the working machine and configured to be connected to a first end of the harness; and
   a second harness connector disposed rearward of the center of gravity of the working machine and configured to be connected to a second end of the harness opposite to the first end,
   wherein a loop handle is disposed on the operation rod, the loop handle being configured to be gripped by a user during operation of the working machine,
   a grip is disposed rearward of the loop handle on the operation rod, the grip being configured to be gripped by the user during the operation of the working machine,
   the grip comprises the first harness connector,
   wherein in a side view of the working machine, the center of gravity of the working machine is positioned on a first harness connector side with respect to a plane that passes through a midpoint of a line connecting the first harness connector with the second harness connector and is perpendicular to the line connecting the first harness connector with the second harness connector,
   wherein the midpoint is a point equidistant from both ends of the line between the first harness connector and the second harness connector.

2. The working machine according to claim 1, wherein the second harness connector is disposed in a vicinity of a rear end of the working machine.

3. The working machine according to claim 2, wherein the prime mover is a motor,
   the working machine further comprises:
   a housing disposed on a rear portion of the operation rod;
   a battery pack configured to be detachably attached to a rear portion of the housing and supply electric power to the motor; and
   a battery guard configured to guard the battery pack from impact, and
   the battery guard comprises the second harness connector.

* * * * *